United States Patent [19]
Nutt et al.

[11] Patent Number: 6,031,666
[45] Date of Patent: Feb. 29, 2000

[54] OPTICAL PHASE NOISE FILTER USING RANDOMLY PLACED SPOTS

[75] Inventors: Alan C. G. Nutt; Jeffrey I. Hirsh, both of Rochester, N.Y.

[73] Assignee: Eastman Kodak Company, Rochester, N.Y.

[21] Appl. No.: 09/131,707

[22] Filed: Aug. 10, 1998

[51] Int. Cl.$^7$ .................................................. G02B 5/30
[52] U.S. Cl. ................................... 359/558; 348/342
[58] Field of Search ............................ 348/342; 359/558

[56] References Cited

U.S. PATENT DOCUMENTS

| | | | |
|---|---|---|---|
| 2,959,105 | 11/1960 | Sayanagi | 430/4 |
| 4,480,896 | 11/1984 | Kubo et al. | 359/707 |
| 5,585,885 | 12/1996 | Muramatsu | 396/111 |
| 5,714,284 | 2/1998 | Hirsh et al. | 430/5 |

OTHER PUBLICATIONS

Kazuo Sayanagi, "Optical Noise Filter", Japan J. Appl. Physics, vol. 27, No. 10, pp. 623–632, translated by M. Ikeda, Jan. 1958.

Yukio Okano, "Optical Phase–Noise Filter for Color Portrait Photography", Proc. International Commission for Optics, (ICO–13), Conf. Digest, Sapporo, Japan, Jan. 1984.

*Primary Examiner*—Ricky D. Shafer
*Assistant Examiner*—John Juba, Jr.
*Attorney, Agent, or Firm*—Raymond L. Owens

[57] ABSTRACT

An optical phase noise filter for use with an optical imaging system such as a solid-state imager or the like, including a transparent substrate; and a plurality of transparent spots randomly placed on the transparent substrate for producing a phase difference between a wavefront transmitted through the transparent spots and that portion of the transparent substrate other than the transparent spots to define an optical phase noise filter having a spatial sampling cut-off frequency and wherein the variance of the transparent spot to transparent spot distance between adjacent spots is minimized while maintaining the randomness of transparent spot placement.

8 Claims, 8 Drawing Sheets

OPTICAL PHASE NOISE FILTER USING RANDOMLY PLACED SPOTS

CROSS REFERENCE TO RELATED APPLICATIONS

The present invention relates to commonly assigned U.S. patent application Ser. No. 08/644,756 filed May 10, 1996 to Revelli et al. entitled "Wavelength-Selective Phase-Type Optical Low-Pass Antialiasing Filter and Fabrication Methods", now abandoned; U.S. patent application Ser. No. 08/863,648, filed May 27, 1997 by Hirsh et al. entitled "Phase-Noise Type Broad Spectral Bandwidth Optical Low-Pass Antialiasing Filter," and U.S. patent application Ser. No. 08/866,273, filed May 30, 1997 by Hirsh et al. entitled "Fill Factor Reduction in Phase Noise Low-Pass Antialiasing Filters", now abandoned the disclosures of which are incorporated herein by reference.

FIELD OF THE INVENTION

The present invention relates to optical low-pass filters which reduce or eliminate high spatial frequencies over a broad spectral bandwidth in order to minimize aliasing artifacts due to discrete sampling of images in image capture devices, such as electronic still cameras with monochromatic or color sensors or single sensor element color video cameras, while at the same time maintaining the highest possible resolution. These antialiasing filters include Color Selective Phase Noise Filters and Non-Color Selective Phase Noise Filters.

BACKGROUND OF THE INVENTION

Solid-state image capture devices such as electronic still cameras and the like rely on an array of discrete light sensitive elements or photosites known as pixels to spatially sample an image of the object and produce sampled output. Because the image is sampled in a discrete manner, images re-created contain false signal content not present in the original object. This phenomenon is known as aliasing and becomes noticeable for those spatial frequency components of the image which are equal to half the spatial sampling frequency along a particular direction of the pixel array, the so-called Nyquist frequency. Although aliasing begins to appear at the Nyquist frequency, it is most pronounced at spatial frequencies that are close to the sampling frequency along the given direction of the pixel array. One particular optical filter, the phase noise filter, is designed to remove the unwanted higher frequencies above the Nyquist frequency of such imagers.

A typical plot of MTF vs. spot height, at the sampling frequency, for three wavelength ranges, for a phase noise filter made of a material having a refractive index of approximately 1.55, is shown in FIG. 1. Color selective phase noise filters are designed to allow the green wavelength band 12 of light (500–570 nm) to pass through the filter with minimum degradation to the MTF, while the MTFs for the blue 13 (400–500 nm) and red 14 (570–700 nm) wavelength bands are reduced to a minimum, when the imaging system uses a Bayer pattern color filter array. As a result of these requirements, a color selective phase noise filter made with a material having a refractive index of approximately 1.55 will have a thickness of approximately 2.86 microns. Non-color selective phase noise filters are designed to have minimum MTF over the three wavelength ranges (400–700 nm), and therefore will have a thickness of approximately 0.4 microns.

In prior art, phase noise filter applications, both color selective and non-color selective as described in the above referenced patent applications, the disclosures of which are incorporated herein by reference, the filters were designed to have a random array of spots covering between 25% and 50% of the filter surface, with no spots on the remaining 75% to 50%. This "fill factor" or "duty cycle" was chosen to maximize blurring of the unwanted light frequencies above the Nyquist point of the sensor. The term "fill factor" means the percentage of the total area of the spots divided by the total filter area. A diagram of a typical random spot pattern of mono-dispersed circular spots is shown in FIG. 2. The same effect holds when the spot diameters are varied about a mean diameter, while maintaining the fill factor.

SUMMARY OF THE INVENTION

It is an object of the present invention to produce an optical phase noise filter having comparable MTF characteristics to those outlined in the prior art, but which has a smaller amount of unwanted high angle diffracted flare light.

This object is achieved by an optical phase noise filter for use with an optical imaging system such as a solid-state imager or the like, comprising:

(a) a transparent substrate; and (b) a plurality of transparent spots randomly placed on the transparent substrate for producing a phase difference between a wavefront transmitted through the transparent spots and that portion of the transparent substrate other than the transparent spots to define an optical phase noise filter having a spatial sampling cut-off frequency and wherein the variance of the distances between adjacent transparent spots is minimized while maintaining the randomness of transparent spot placement.

The present invention has the advantage of reduced flare light. By minimizing the variance of the distances between adjacent randomly placed transparent spots, optical flare, i.e. the high angle light scatter that occurs when adjacent spots are placed in close proximity (less than 4% of their diameter) to one an other, can be reduced.

In addition, the MTF cut-off of the optical phase noise filter can be adjusted in accordance with the present invention.

DETAILED DESCRIPTION OF THE INVENTION

In commonly-assigned U.S. patent application Ser. Nos. 08/644,756 and U.S. patent application Ser. No. 08/866,273, filed May 27, 1997 by Hirsh et al, the relationship between MTF and the optical phase noise filter characteristics at a particular wavelength, λ, is as follows:

$$MTF(f) = [1 - (2FF)(1 - \cos \phi)(1 - g(h))],  \quad \text{Eq.1}$$

where f is the spatial frequency, FF is the fill factor of the optical phase noise filter, and g(h) is the auto-correlation of the transparent spots 11 in the optical phase noise filter and ranges from 0 to 1 (i.e. 0% to 100% overlap).

$$h = \frac{\lambda bf}{2}, \quad \text{Eq. 2}$$

$$\phi = 2\pi \frac{n - n'}{\lambda} t, \quad \text{Eq. 3}$$

where n is the index of refraction of the material forming said transparent spots 11 at the specific wavelength λ, n' is the index of refraction of the medium surrounding the transparent spots 11 the specific wavelength λ, and t is the physical thickness of the transparent spots 11. The factor b is either the distance of the optical phase noise filter from the image plane when the optical phase noise filter is placed between the imaging lens system and the sensor, or the focal length of the imaging system when the optical phase noise filter is placed outside the imaging system.

Figure 1:
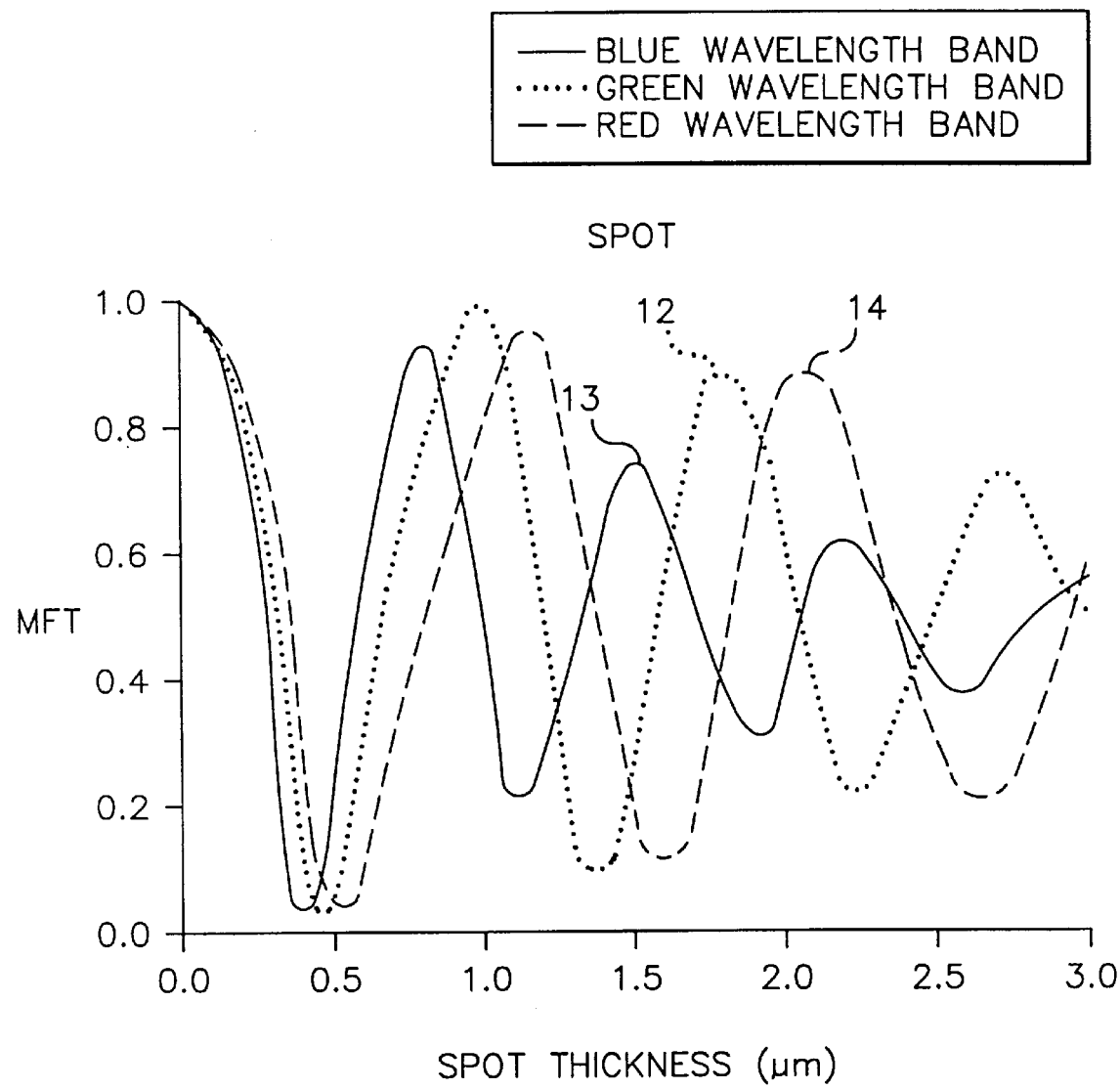
FIG. 1 is a plot of MTF vs. transparent spot thickness known in the prior art at the sampling frequency of an imaging system as a function of phase noise transparent spot thickness, for red, green and blue wavelength bands.
Figure 2A:
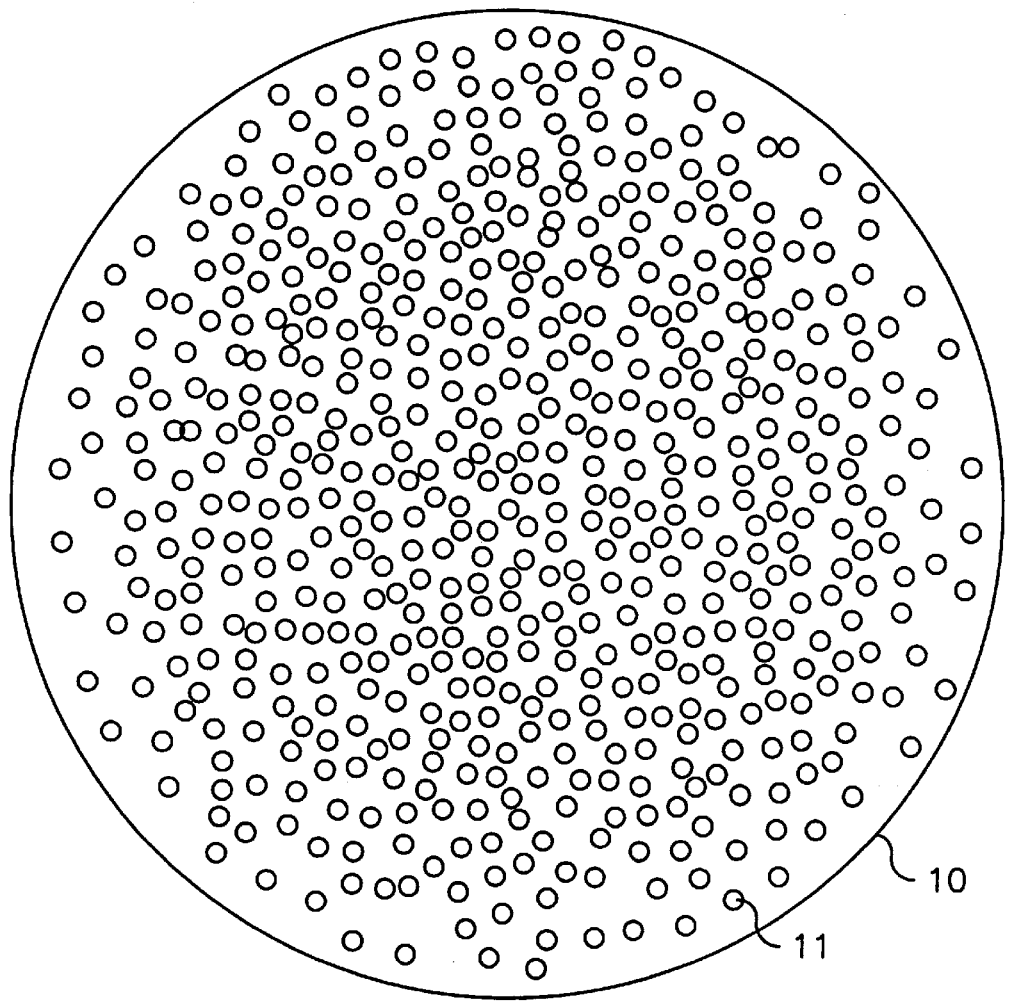
FIG. 2a is a plan view showing the randomly placed transparent spots known in the prior art which produces an optical phase noise filter.
Figure 2B:
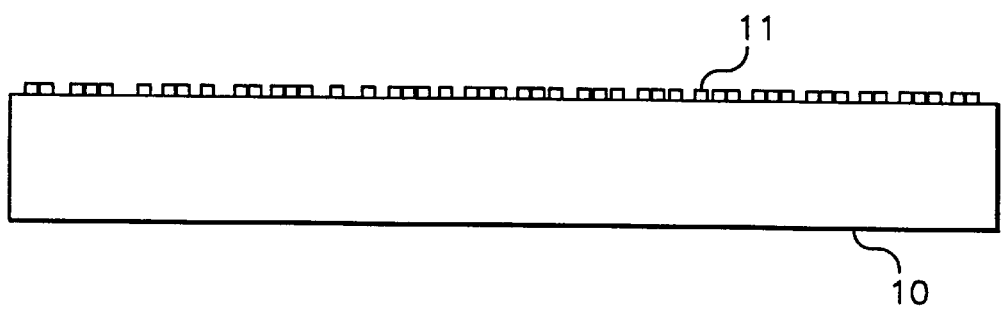
FIG. 2b is a side view showing the randomly placed transparent spots known in the prior art which produces an optical phase noise filter.

Referring now to FIGS. 2a and 2b, an optical phase noise filter for use with an optical imaging system of a solid-state imager or the like includes a transparent substrate 10. A plurality of randomly positioned transparent spots 11 is provided on or below the surface plane of the transparent substrate 10.

The plurality of transparent spots 11 is randomly placed on the transparent substrate 10 to produce a phase difference between a wavefront transmitted through the transparent spots 11 and that portion of the transparent substrate 10 other than the transparent spots 11. This arrangement defines an optical phase noise filter having a spatial sampling cut-off frequency. In accordance with the invention, the variance of the transparent spot 11 to transparent spot 11 distance (edge to edge) between adjacent transparent spots 11 is minimized while maintaining the randomness of transparent spot 11 placement. The term "variance" as used herein is in a statistical sense and it can be computed by measuring all of the distances between adjacent transparent spots 11 and performing mathematical variance calculations. This variance should be minimized to provide the best results while at the same time maintaining the randomness of the placement of the transparent spots 11. This randomness of the optical filter can be assured by insuring that there is no angular noise dependence to the optical phase noise filter.

It has been found quite effective to use transparent spots 11 having circular or polygonal shapes. It will be understood, however, that other shapes of transparent spots 11 can be used in accordance with the present invention, and that the transparent spots 11 can be depressions or elevations relative to the surface of transparent substrate 10. In the case shown in FIGS. 2a and 2b, the transparent spots 11 are elevated with respect to the transparent substrate 10. The optical phase noise filter can be chosen to be either color selective or non-color selective by selecting the transparent spot 11 thickness, as described earlier. The transparent spots 11 should of course be randomly placed and the transparent spot 11 to transparent spot 11 placement arranged to minimize the variance. The transparent spots 11 thus selected in accordance with the present invention will provide an anti-aliasing effect for both color selective and non-color selective optical phase noise filter designs. For a material that has a index of refraction of approximately 1.55 and for a optical phase noise filter that is non-color selective, the transparent spots 11 are typically 0.4 microns thick, and for an optical phase noise filter that is color selective the transparent spots 11 are 2.8 to 3.0 microns thick. A schematic diagram of the standard optical phase noise filter can be seen in FIGS. 2a and 2b, with the minimum transparent spot 11 to transparent spot 11 spacing approximately 3.6% of the transparent spot 11 diameter.

When the optical phase noise filter is non-color selective, the transparent spots 11 provide approximately a τ phase shift of the light transmitted through the transparent spots 11, relative to the light passing through areas other than the transparent spots 11. The transparent spot 11 thickness can be determined empirically, as outlined in the referenced patent applications for one particular case. The transparent spots 11 are selected so that the total area of all the transparent spots 11 is in a range of between 25% and 50% of the total area of the transparent spots 11 and the portions of the transparent substrate 10 other than the transparent spots 11. MTF plots of the optical system when standard optical phase noise filters are used can be seen in FIG. 3a for randomly placed 300 μm diameter transparent spots 11 having a fill factor of 40% and a minimum transparent spot 11 to transparent spot 11 spacing of 5 μm and FIG. 3b for randomly placed 140 μm diameter transparent spots 11 having a fill factor of 35% and a minimum transparent spot 11 to transparent spot 11 spacing of 5 μm.

In accordance with the present invention, the optical phase noise filter is designed to blur unwanted higher frequency information than the detector pixel pitch, over two pixels. The optical phase noise filter transparent spot 11 diameter is chosen to achieve this diffraction effect. The spacing between transparent spots 11 also contributes to the diffraction effects. For a 50% fill factor optical phase noise filter these spacings will be much less than the transparent spot 11 diameter and hence will scatter light at much higher angles over much more than two pixels. This unwanted light scatter is a part of the overall system optical flare and should be minimized. To reduce the higher angled scattered light the spacing between transparent spots 11 should be made as close to the transparent spot 11 diameter as is possible while maintaining the randomness of the transparent spot 11 placement.

Figure 4A:
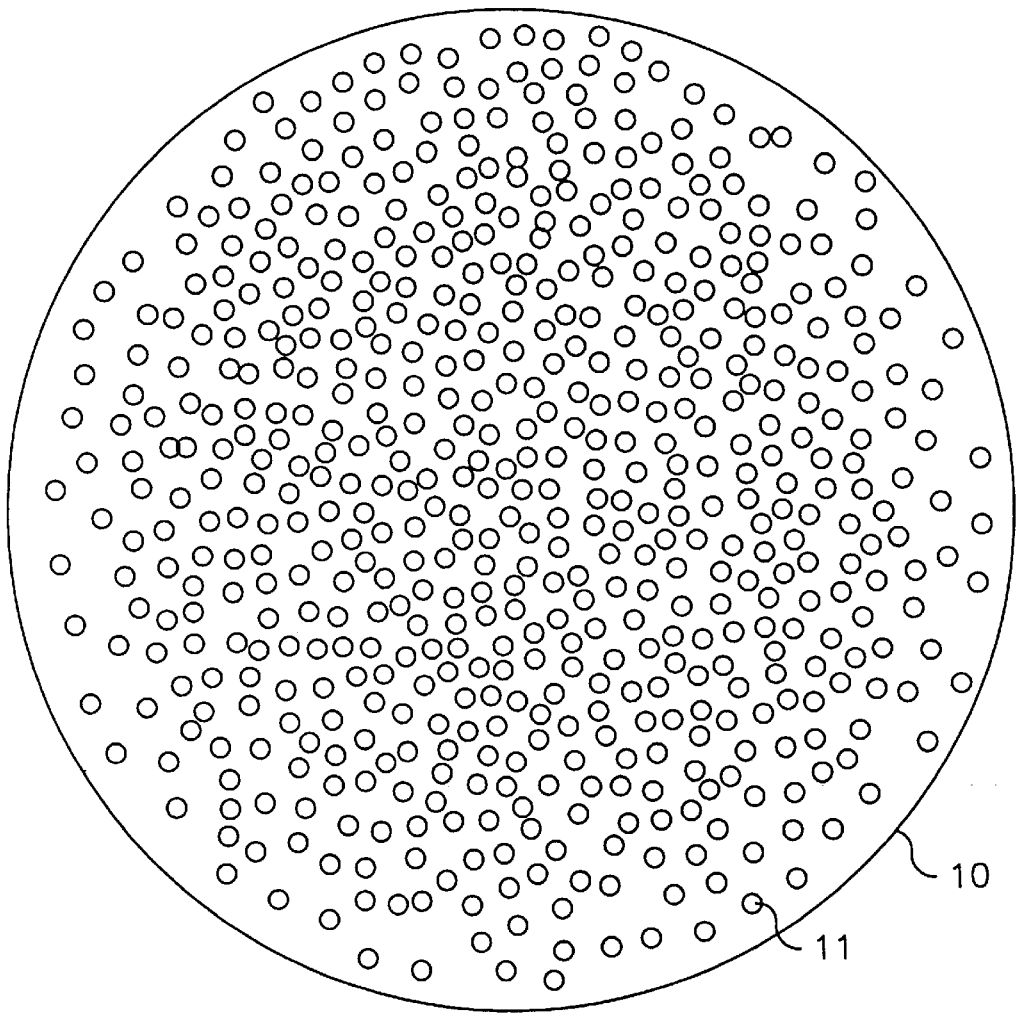
FIG. 4a is a plan view showing the randomly placed transparent spots in accordance with the present invention which produces an optical phase noise filter.
Figure 4B:
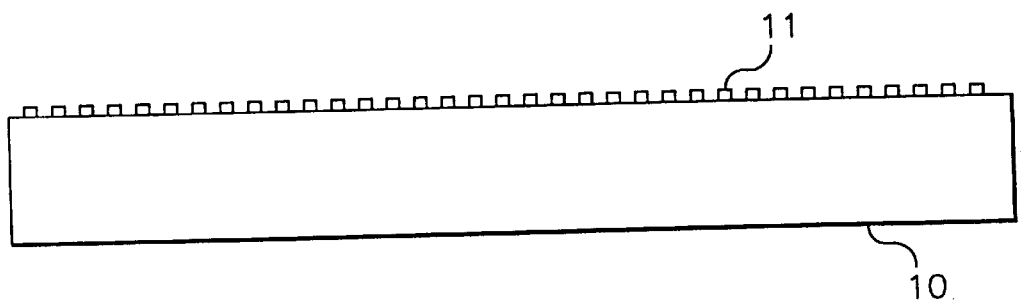
FIG. 4b is a side view showing the randomly placed transparent spots in accordance with the present invention which produces an optical phase noise filter.

FIGS. 4a and 4b show a plan view and a cross-section of an optical phase noise filter in accordance with the present invention, with the minimum transparent spot 11 to transparent spot 11 spacing 21.4% of the transparent spot 11 diameter.

Measurements were made of optical system flare. The optical phase noise filter structures had randomly placed 300 μm diameter transparent spots 11, a fill factor of 40% and differed only by the minimum transparent spot 11 to transparent spot 11 spacing of 5 μm (typical optical phase noise filter) and a minimum transparent spot 11 to transparent spot 11 spacing of 44.5 μm (in accordance with the present invention). There was consistently 5% less flare measured in the samples that had the increase minimum transparent spot 11 to transparent spot 11 spacing. The overall reduction in optical flare is 0.1 dB. Any measurable reduction in optical system flare is useful.

Initially the MTF of optical phase noise filters were assumed to remain constant as long as the transparent spot 11 diameter, the transparent spots 11 fill factor and the transparent spot 11 distribution were held constant. It was thought that if the distribution of transparent spot 11 to transparent spot 11 spacings was gaussian in nature and hence as the transparent spot 11 to transparent spot 11 variance is decreased so the maximum transparent spot 11 to transparent spot 11 spacing is reduced thus optical flair would be affected but overall phase noise MTF would remain constant.

Figure 3A:
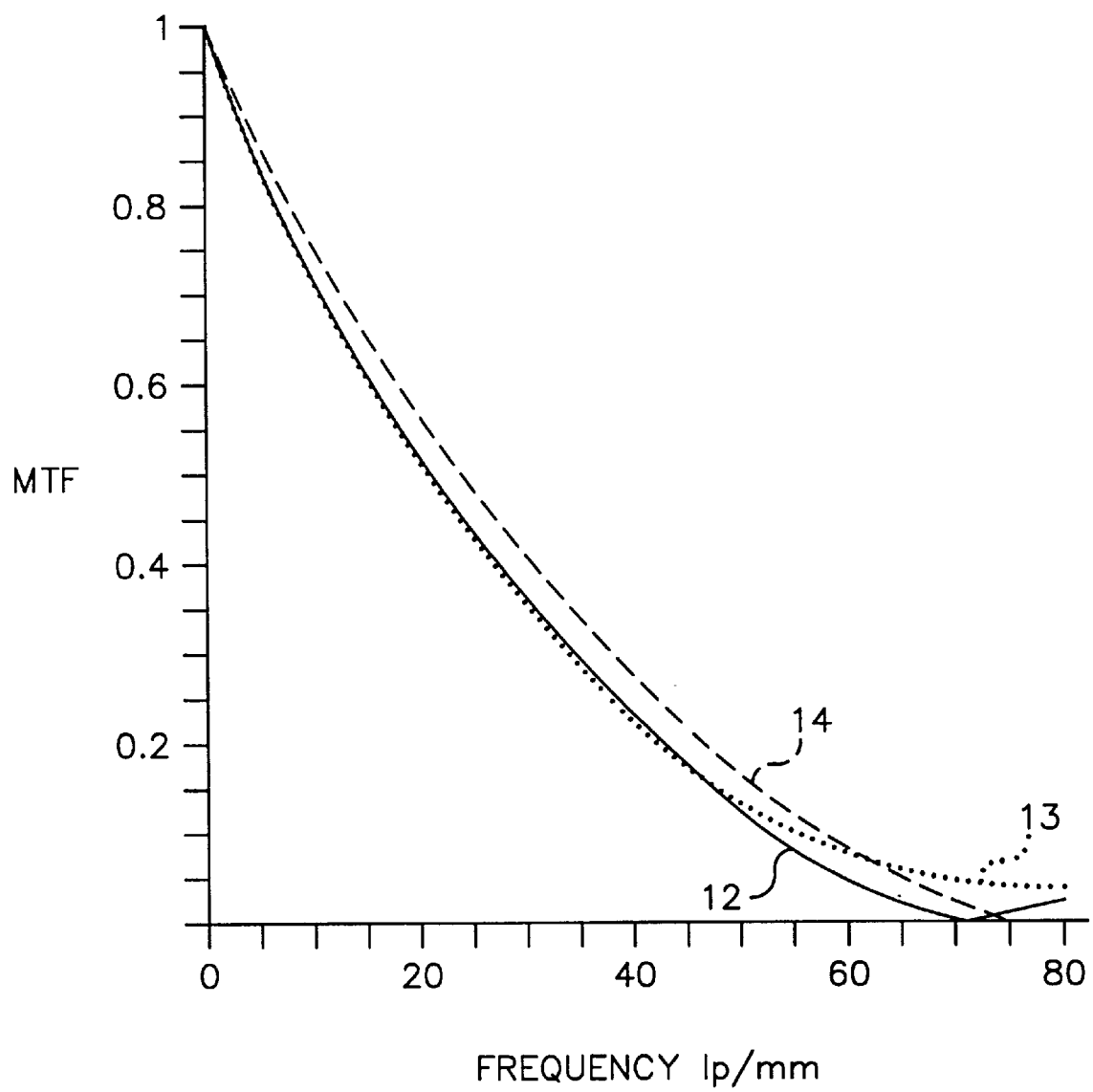
FIG. 3a is a plot of MTF vs. spatial frequency of a prior art optical phase noise filter whose transparent spot diameter is 300 μm, transparent spot thickness is 0.42 μm, fill factor is 40% and minimum transparent spot separation is 5 μm.
Figure 3B:
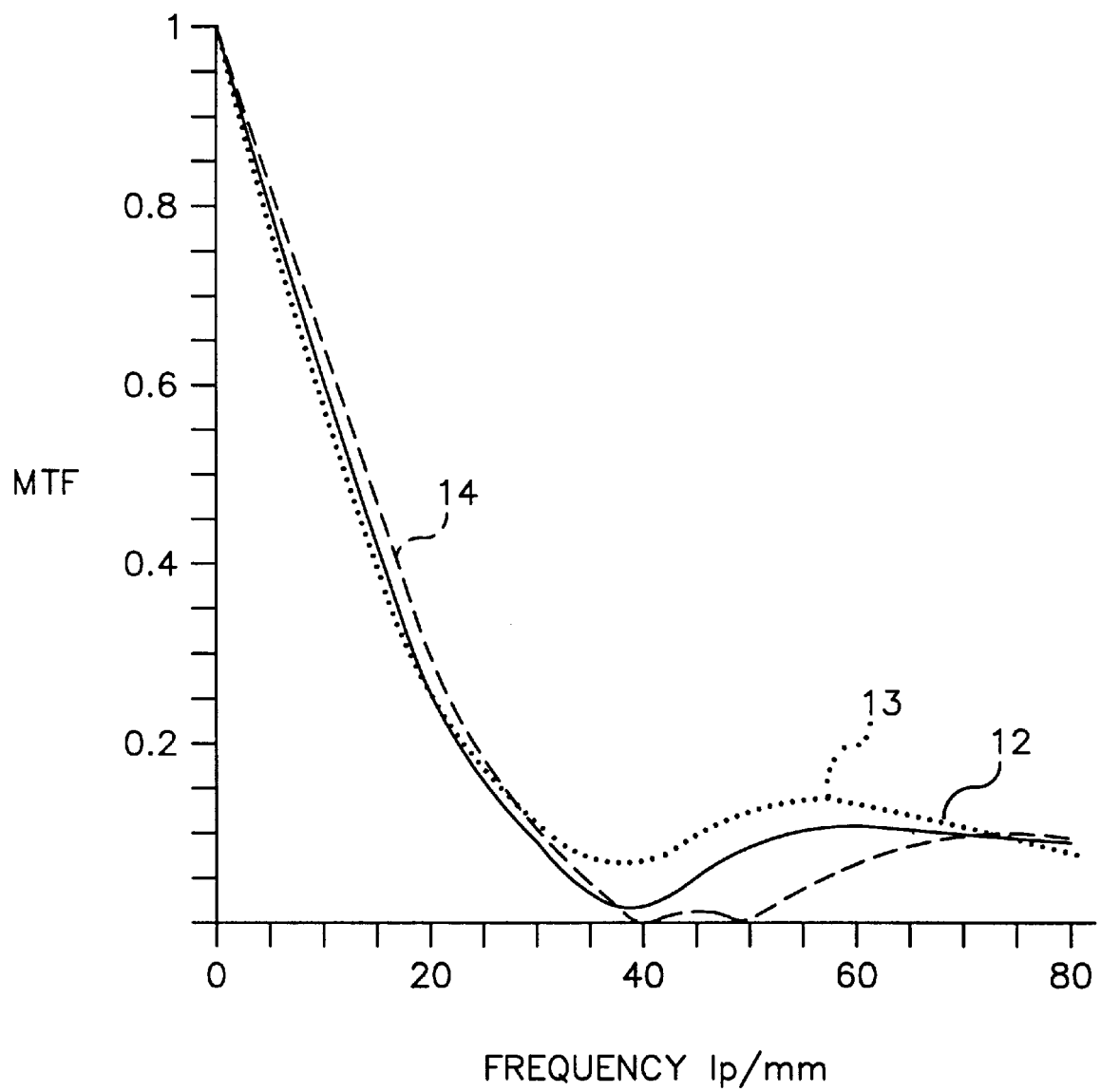
FIG. 3b is a plot of MTF vs. spatial frequency of a prior art optical phase noise filter whose transparent spot diameter is 140 μm, transparent spot thickness is 0.42 μm, fill factor is 35% and minimum transparent spot separation is 5 μm.
Figure 5A:
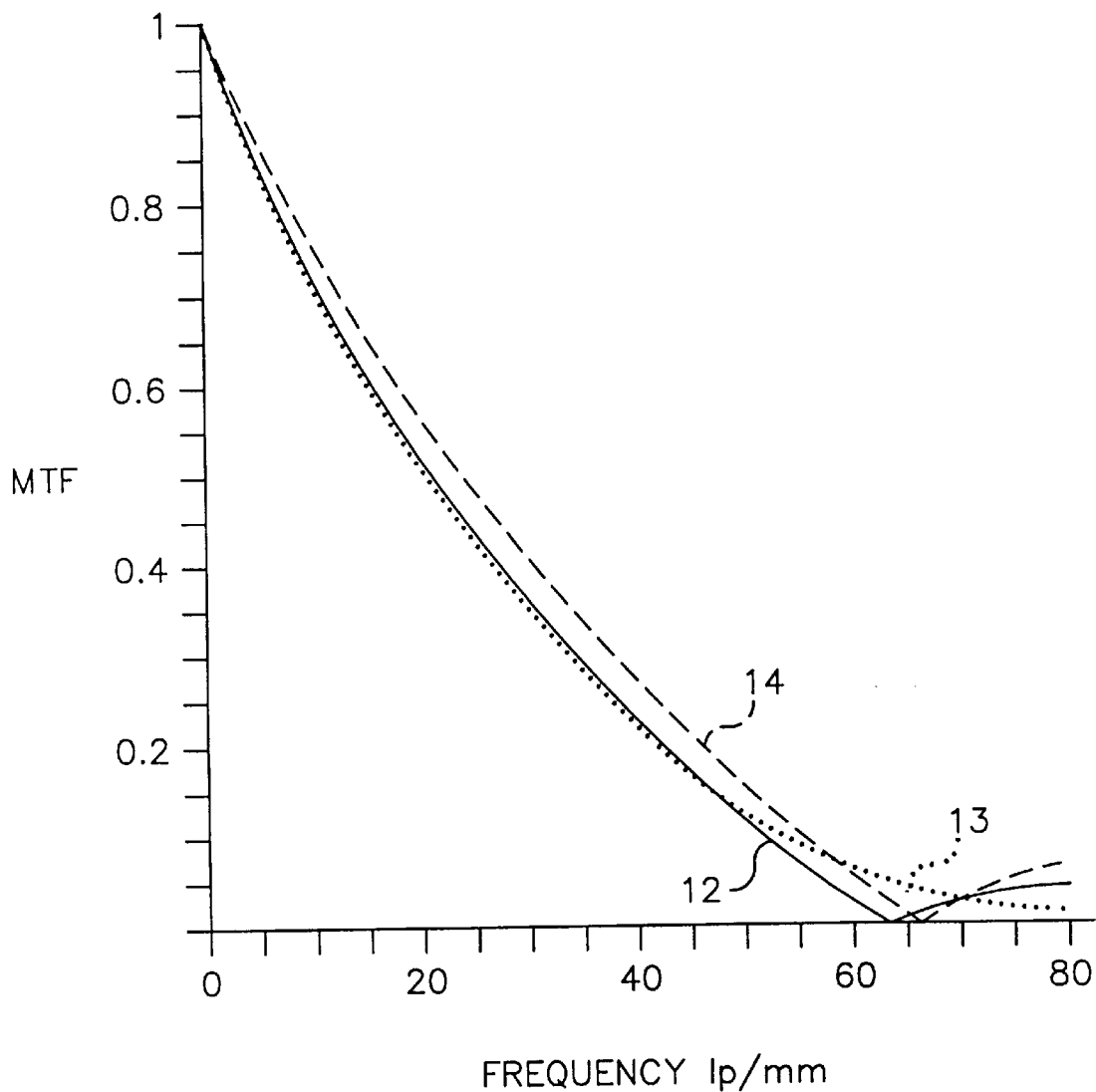
FIG. 5a is a plot of MTF vs. spatial frequency of an optical phase noise filter in accordance with the present invention whose transparent spot diameter is 300 μm, transparent spot thickness is 0.42 μm, fill factor is 40% and minimum transparent spot separation is 45 μm.
Figure 5B:
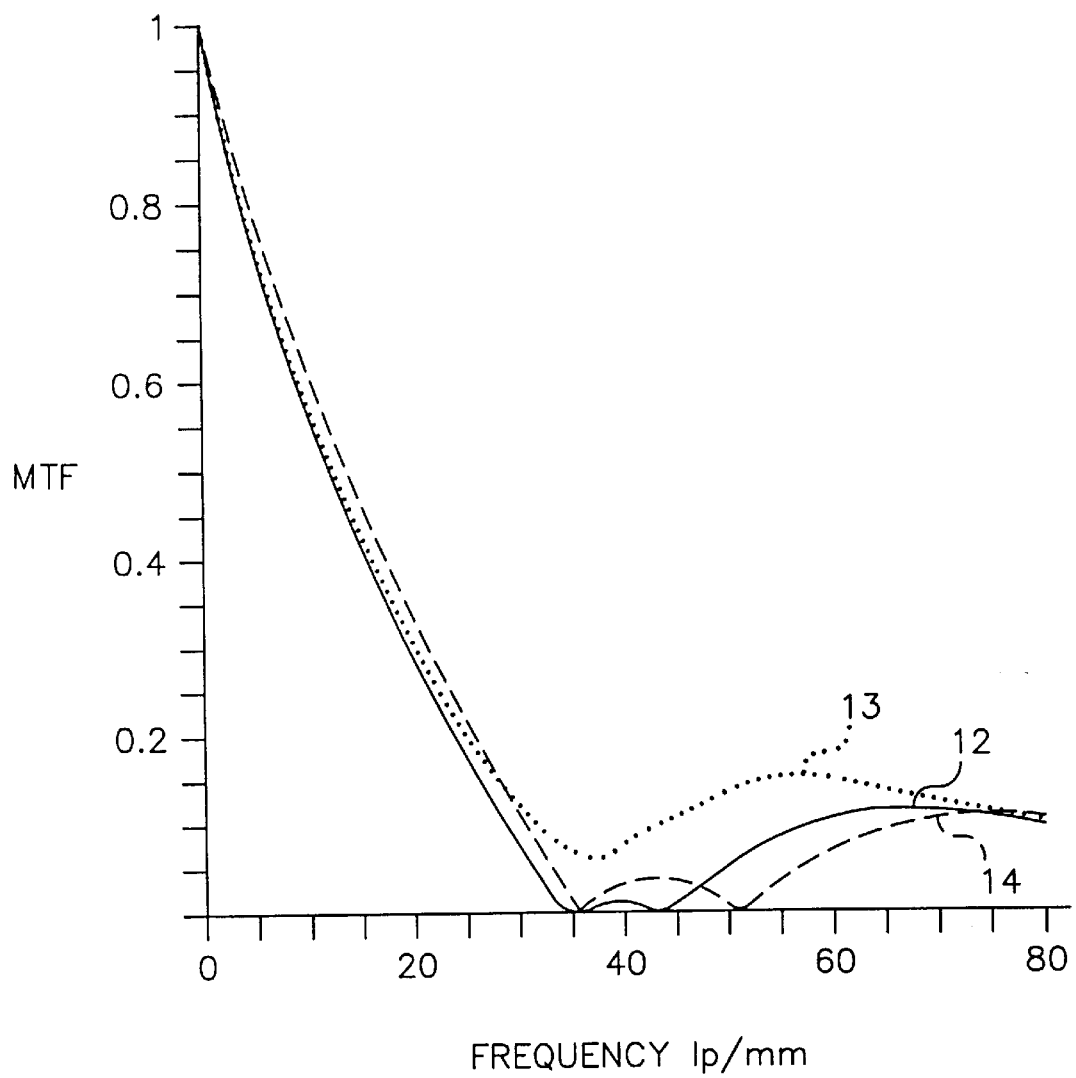
FIG. 5b is a plot of MTF vs. spatial frequency of an optical phase noise filter in accordance with the present invention whose transparent spot diameter is 140 μm, transparent spot thickness is 0.42 μm, fill factor is 35% and minimum transparent spot separation is 30 μm.

FIGS. 5a and 5b show the effect on system MTF of increasing the minimum transparent spot 11 to transparent spot 11 spacing on a random array compared to the standard optical phase noise filter response as shown in FIG. 3a and 3b respectively. FIG. 5a is an MTF plot calculated from a non-color selective optical phase noise filter in accordance with the present invention with a transparent spot 11 diameter of 300 μm and a fill factor of 40% and a minimum transparent spot 11 to transparent spot 11 spacing of 45 μm and should be compared to the standard optical phase noise filter MTF shown in FIG. 3a. In this case the MTF cut-off frequency of the green light moved from 72 lp/mm to 63 lp/mm when the minimum transparent spot 11 to transparent spot 11 spacing was increased. FIG. 5b is an MTF plot calculated from a non-color selective optical phase noise filter in accordance with the present invention with a transparent spot 11 diameter of 140 μm and a fill factor of 35% and a minimum transparent spot 11 to transparent spot 11 spacing of 30 μm and should be compared to the standard optical phase noise filter MTF shown in FIG. 3b. In this case the MTF cut-off frequency for the green wavelength band moved from 39 lp/mm to 34 lp/mm when the minimum transparent spot 11 to transparent spot 11 spacing was increased. The reduction in MTF cut-off point is shown conceptually in FIG. 6.

Figure 6:
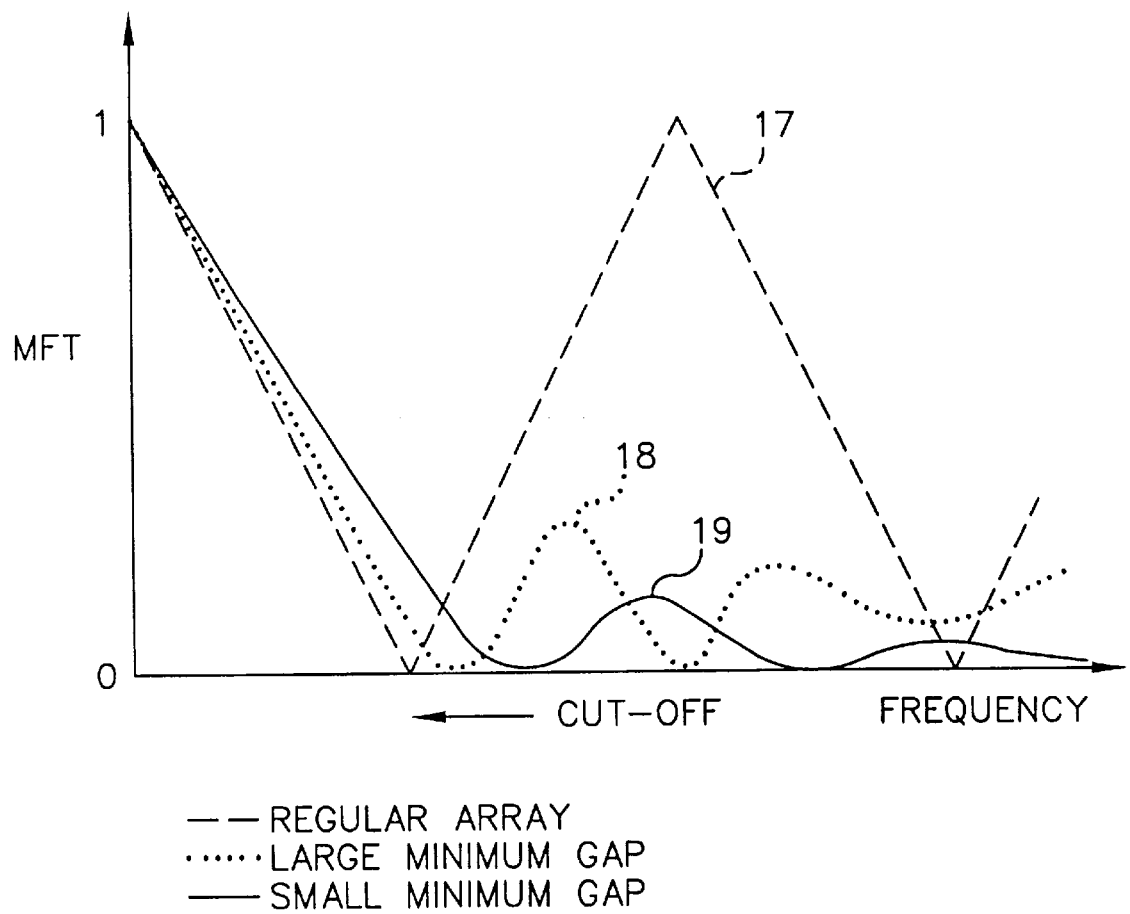
FIG. 6 is a schematic diagram depicting the MTF vs. Spatial Frequency of a Regular array, an array with transparent spot to transparent spot spacing comparable the transparent spot diameter, and an array with the average transparent spot to transparent spot spacing being less than 10% of the transparent spot diameter.

In FIG. 6 three plots are shown. Plot 17 represents a regular array, that is the transparent spots 11 are not randomly spaced. Plots 18 can correspond to a large minimum transparent spot 11 to transparent spot 11 spacing (See FIG. 4a) and Plot 19 represents a small minimum transparent spot 11 to transparent spot 11 spacing (See FIG. 2a). The MTF cut-off is moved by about 13% in both cases. The design parameters in optical phase noise filters must include a factor which is a function of the minimum transparent spot 11 to transparent spot 11 spacing as a percentage of the transparent spot 11 diameter. This factor will affect g(h), which is the auto-correlation function of neighboring transparent spots 11.

The invention has been described in detail with particular reference to certain preferred embodiments thereof, but it will be understood that variations and modifications can be affected within the spirit and scope of the invention.

PARTS LIST 10 transparent substrate
11 transparent spots
12 Green Wavelength Band
13 Blue Wavelength Band
14 Red Wavelength Band
15 Plot of regular array
16 Plot of large minimum random spacing
17 Plot of small minimum random spacing

What is claimed is:

1. An optical phase noise filter for use with an optical imaging system such as a solid-state imager, comprising:
   (a) a transparent substrate; and
   (b) a plurality of transparent spots randomly placed on the transparent substrate for producing a phase difference between a wavefront transmitted through the transparent spots and that portion of the transparent substrate other than the transparent spots to define an optical phase noise filter having a spatial sampling cut-off frequency and wherein the variance of the transparent spot to transparent spot distance between adjacent transparent spots is minimized while maintaining the randomness of transparent spot placement.

2. The optical phase noise filter according to claim 1 where the pattern fill factor is between 25 to 50% in order to permit the maximum distance between transparent spots while still maintaining minimum variance.

3. The optical phase noise filter according to claim 1 wherein the transparent spots have shapes that are polygons.

4. The optical phase noise filter according to claim 1 wherein the transparent spots can be above the surface plane of the transparent substrate.

5. The optical phase noise filter according to claim 1 wherein the optical phase noise filter is color selective.

6. The optical phase noise filter according to claim 1 wherein the optical phase noise filter is non-color selective.

7. The optical phase noise filter according to claim 1 wherein the transparent spots have shapes that are circles.

8. The optical phase noise filter according to claim 1 wherein the transparent spots can be below the surface plane of the transparent substrate.

* * * * *